United States Patent
Geffert et al.

(10) Patent No.: US 11,162,409 B2
(45) Date of Patent: Nov. 2, 2021

(54) APPARATUS FOR REGULATING THE COOLANT FLOW IN INTERNAL COMBUSTION ENGINES

(71) Applicant: Dr. Ing. h.c. F. Porsche Aktiengesellschaft, Stuttgart (DE)

(72) Inventors: Thomas Geffert, Freiberg am Neckar (DE); Frank Blum, Siegelsbach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 15/641,412

(22) Filed: Jul. 5, 2017

(65) Prior Publication Data

US 2018/0010509 A1    Jan. 11, 2018

(30) Foreign Application Priority Data

Jul. 5, 2016   (DE) .................... 10 2016 112 235.1

(51) Int. Cl.
*F01P 7/14*      (2006.01)
*F16D 65/827*    (2006.01)

(52) U.S. Cl.
CPC .............. *F01P 7/14* (2013.01); *F16D 65/827* (2013.01); *F01P 2007/143* (2013.01); *F01P 2007/146* (2013.01)

(58) Field of Classification Search
CPC ... F01P 7/14; F01P 2007/143; F01P 2007/146
USPC ...................................... 123/41.02
See application file for complete search history.

(56) References Cited

U.S. PATENT DOCUMENTS

| | | | | |
|---|---|---|---|---|
| 4,006,804 A | * | 2/1977 | Fehr | F04C 14/06 188/293 |
| 4,029,159 A | * | 6/1977 | Nymann | B23Q 11/0092 173/217 |
| 4,082,369 A | * | 4/1978 | Black | B60T 8/4095 188/296 |
| 5,979,373 A | | 11/1999 | Sano | |
| 7,108,493 B2 | * | 9/2006 | Clements | F04C 2/344 418/1 |
| 2005/0034688 A1 | * | 2/2005 | Lelkes | F01P 7/167 123/41.01 |
| 2013/0161548 A1 | * | 6/2013 | Matsusaka | F01P 7/16 251/129.22 |
| 2015/0083057 A1 | * | 3/2015 | Tsuchiya | F01P 7/14 123/41.08 |

FOREIGN PATENT DOCUMENTS

| | | |
|---|---|---|
| DE | 1 227 287 | 10/1966 |
| DE | 10 2012 022 788 | 12/2013 |

(Continued)

OTHER PUBLICATIONS

Korean Office Action dated Nov. 7, 2018.
Chinese Office Action dated Mar. 26, 2019.

*Primary Examiner* — Lindsay M Low
*Assistant Examiner* — Omar Morales
(74) *Attorney, Agent, or Firm* — Gerald E. Hespos; Michael J. Porco; Matthew T. Hespos (57) ABSTRACT

An apparatus for regulating the coolant flow for internal combustion engines in motor vehicles has a valve body which can be moved in a valve apparatus (8) for opening or closing or partially opening. The valve body can be arranged in a throughflow opening to be connected to a brake system (1, 2, 3, 4; 11, 12, 13, 14; 21, 22, 23, 24, 25) to regulate the volume of the coolant flow.

12 Claims, 6 Drawing Sheets

(56) References Cited

FOREIGN PATENT DOCUMENTS

| | | |
|---|---|---|
| FR | 1 331 479 | 7/1963 |
| JP | 10-317966 | 12/1998 |
| JP | 11-218248 | 8/1999 |
| JP | 2007006590 A | 1/2007 |
| JP | 2007292160 A | 11/2007 |
| JP | 2008155769 A | 7/2008 |

\* cited by examiner

Fig.10

# APPARATUS FOR REGULATING THE COOLANT FLOW IN INTERNAL COMBUSTION ENGINES

CROSS REFERENCE TO RELATED APPLICATION

This application claims priority under 35 USC 119 to German Patent Appl. No. 10 2016 112 235.1 filed on Jul. 5, 2016, the entire disclosure of which is incorporated herein by reference.

BACKGROUND

1. Field of the Invention

The invention relates to an apparatus for regulating the coolant flow, in particular for internal combustion engines in motor vehicles. The apparatus includes a valve body that can be moved in a valve apparatus.

2. Description of the Related Art

Internal combustion engines usually are cooled by regulating a flow of coolant. This regulation typically takes place via thermostatically controlled regulating valves. As a rule, the regulating valves permit only opening/closing regulation. More sensitive regulation that is adapted to the respective operating conditions is feasible by way of valve constructions of this type only with relatively great complexity.

The prior art also has a wide variety of drum brake systems. For instance, FR 1 331 479 describes a drum brake arrangement in which a machine that is driven by an electric motor can be braked via an electromagnetic apparatus. Here, the electromagnetic apparatus has a brake drum, a brake disk that interacts with the brake drum, and two ferromagnetic systems that are coupled to one another under the action of leaf springs.

DE 1 227 287 discloses an electromagnetically controllable internal expanding drum brake with an annular magnetic body and magnet armatures that interact with that magnetic body and support the brake elements. The magnet armatures are pressed against the brake drum by springs in the case of a de-energized magnetic body.

U.S. Pat. No. 4,029,159 discloses a brake apparatus for manually actuated electric appliances with rotating tools. Here, they are pressed against a brake drum or pressed away from it via cams that are engaged with an electromagnetic coil.

An object of the invention is to provide a more sensitive, simply constructed and reliable apparatus that permits any desired coolant flow volume for regulating the coolant flow, preferably in internal combustion engines.

SUMMARY

The object is achieved by having the movable valve body of a valve apparatus connected to a brake system to regulate the throughflow of the coolant flow.

One brake system of this type has a valve body that is rotatable on an axle of the brake system in the valve apparatus for closing and/or opening or partially opening at least one throughflow opening for a coolant. The valve body also could displaceable in a throughflow opening of a valve apparatus.

The brake system can be actuated in an electromagnetic manner to regulate the coolant flow. To this end, at least one brake element is provided between the rotor and the stator of the electromagnetically actuable brake system and can be moved under the magnetic action. Two brake elements may be suspended so that they can be moved pivotably with respect to one another and largely enclose the rotor and the stator. The brake elements are brought into a braking action by the energization of the magnet system for positioning the valve body. The braking action may act directly or indirectly on the positioning of the valve body in relation to the throughflow opening and may hold the valve body in any desired position in the throughflow opening of the valve apparatus. As a result, the volumetric flow of cooling liquid can be brought from a maximum open position (brake system without any action on the valve body) as far as into the closed position and into every intermediate position. In the closed position, the coolant is conducted exclusively via the cooling circuit of the internal combustion engine. In the maximum open position or in partial open positions of the valve body, the coolant is guided via the additionally arranged cooling apparatuses for cooling the coolant. In the intermediate or partial open positions, merely a higher or lower volumetric flow of cooling liquid is conducted via the additionally arranged cooling apparatuses.

The brake system can be a rotational body that can be connected to the valve body. Brake elements may be arranged on the outer circumference of the rotational body and may be pivoted by a solenoid.

As an alternative, a rotational body can be connected to the valve body for adjusting the valve body. The rotational body can be provided with at least one movable brake element. The brake element can be adjusted via an adjusting mechanism. The adjusting mechanism can be driven by a worm gear that is driven directly or indirectly via an electric actuator and is engaged via a spur toothing system with the rotor for adjusting the valve body.

The brake elements of the brake system can be moved into a non-braking position under the action of a spring element to ensure the cooling and to prevent damage to the internal combustion engine in the case of a failure of functions, for example in the electric system of the vehicle. The non-braking position the valve body completely releases the coolant flow to avoid overheating in the internal combustion engine.

A regulating system with the above-described features can be used for regulating the coolant flow in internal combustion engines for motor vehicles.

Advantages, features and details of the inventive solution in an apparatus for regulating the coolant flow in internal combustion engines of motor vehicles result from the following description of a plurality of alternative embodiments and using the diagrammatic illustrations in this respect in the drawings. The described features and combinations of features, as shown in the figures of the drawing in the following text, and the features and combinations of features that are described using the drawing can be used not only in the respectively specified combination, but also in other combinations or else on their own, without in this way departing from the scope of the invention.

DETAILED DESCRIPTION

FIGS. 1-4 show a brake system in accordance with the invention, in which brake elements 3 are arranged in a pivotably movable manner between a rotor 1 and a magnetic stator 2. The brake elements 3 are mounted pivotably via pivot points 4 so that the brake elements 3 can be moved from a non-braking action position upon energization of the magnet system into a braking action position. The valve body (not shown) is connected to the brake system and, via the braking action, the valve body is held fixedly in any desired position in the throughflow opening of the valve apparatus (not shown here). In this way, the coolant flow can be regulated in a sensitive manner.

Figure 1:
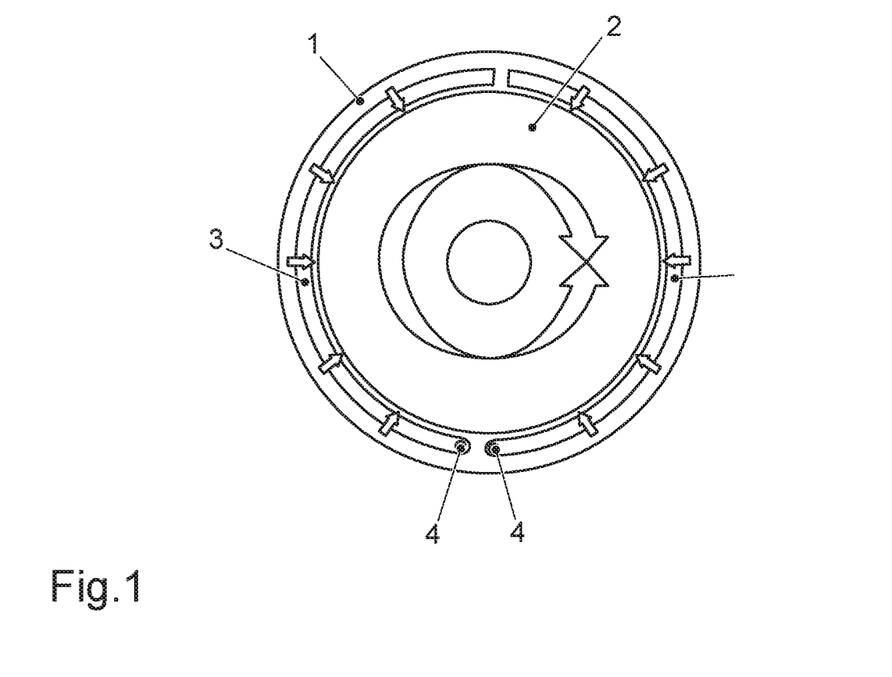
FIG. 1 shows a brake system according to the invention in a first variant.
Figure 2:
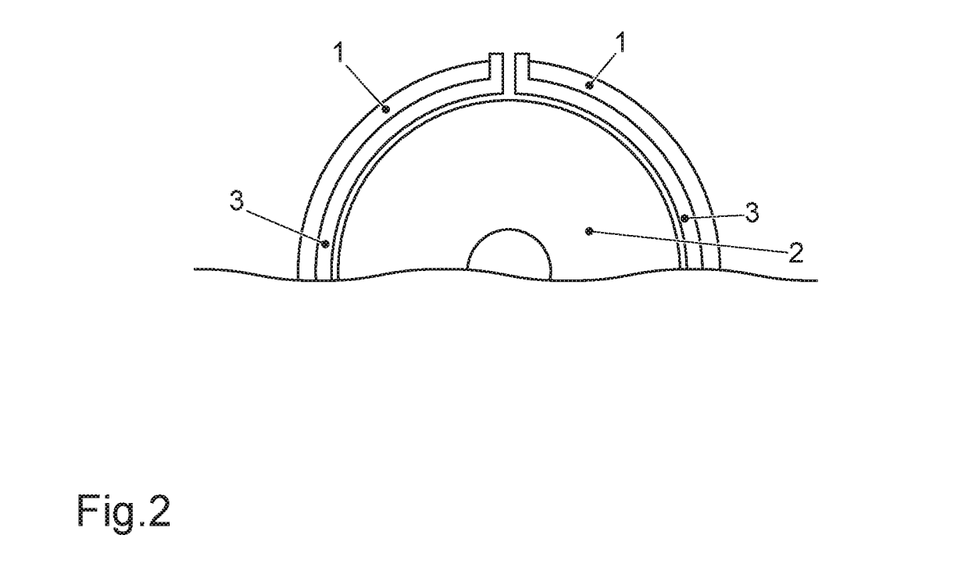
FIG. 2 shows details of the brake system in the first variant.
Figure 3:
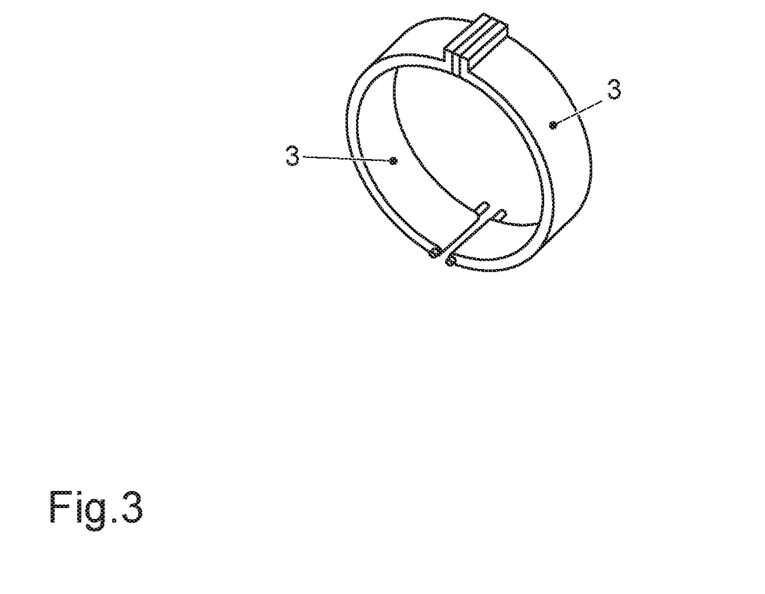
FIG. 3 shows brake elements, as are used, for example, in the brake system of the first variant.
Figure 4:
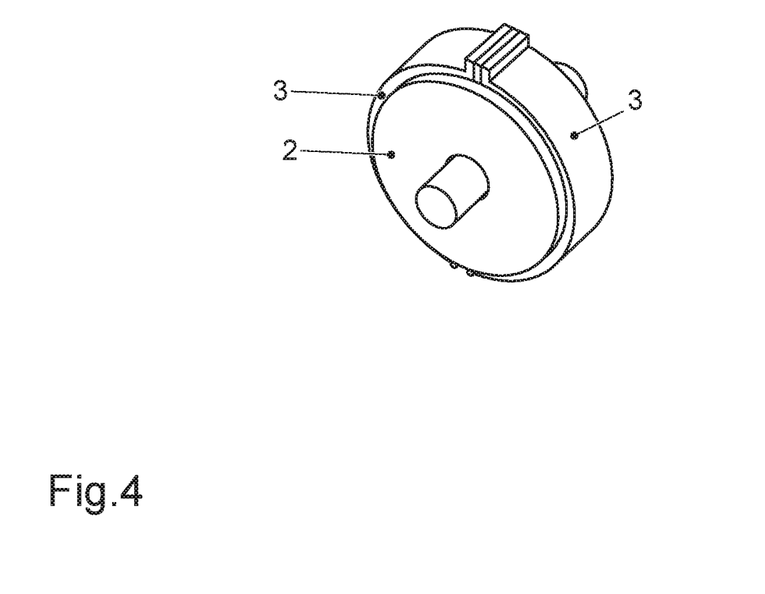
FIG. 4 shows the arrangement of the brake elements in the brake system according to FIGS. 1-3.

FIG. 2 is a perspective illustration of the arrangement of the brake elements 3 in relation to the rotor 1 and the stator 2. FIG. 3 shows the brake elements 3 separately. FIG. 4 shows the arrangement of the brake elements 3 with respect to the stator 2.

Figure 5:
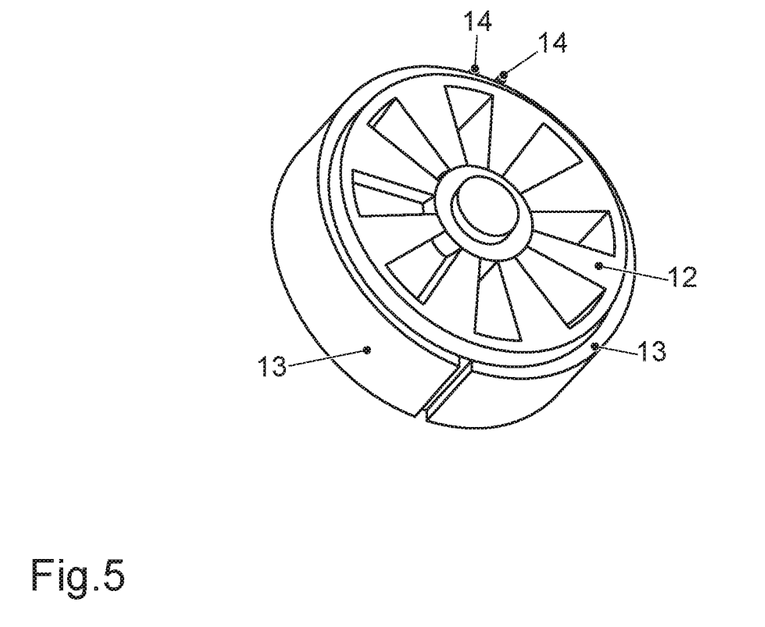
FIG. 5 and FIG. 6 show a second variant of a brake system in accordance with the invention.
Figure 6:
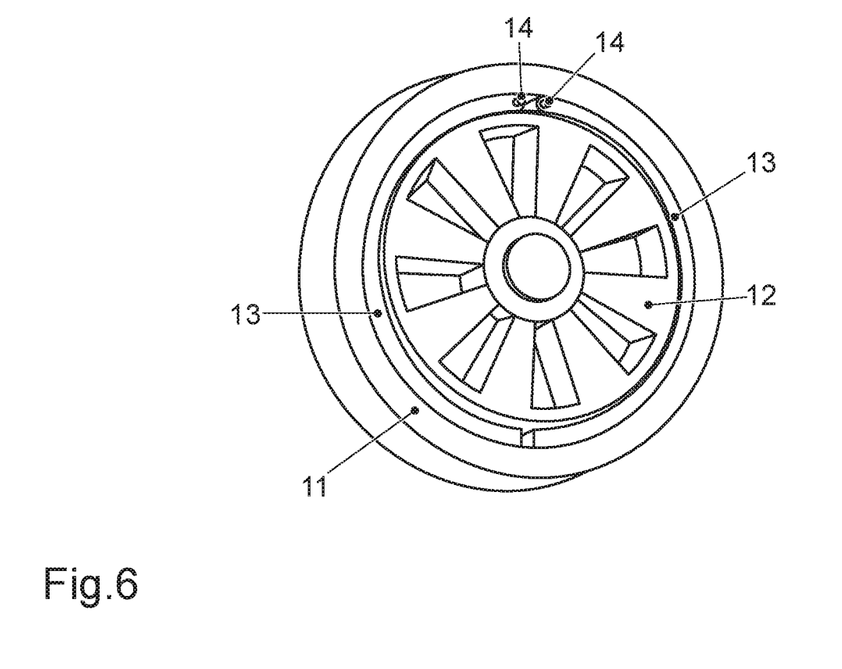

A variant of the brake system in accordance with the invention is shown in FIGS. 5 and 6 differs from the system of FIGS. 1-4 merely in that a rotor 11 encloses a magnetic stator 12 in an annularly circumferential manner on the outside. Brake elements 13 once again are arranged between the rotor 11 and the stator 12, and the brake elements 13 can be brought into a braking function under the magnetic action. Here, the brake elements 13 pivot under the magnetic action about the pivot points 14, in which they are suspended in a pivotably movable manner.

The function of the brake system according to FIGS. 5 and 6 corresponds substantially to the function, as has already been described above using FIGS. 1-4.

Figure 7:
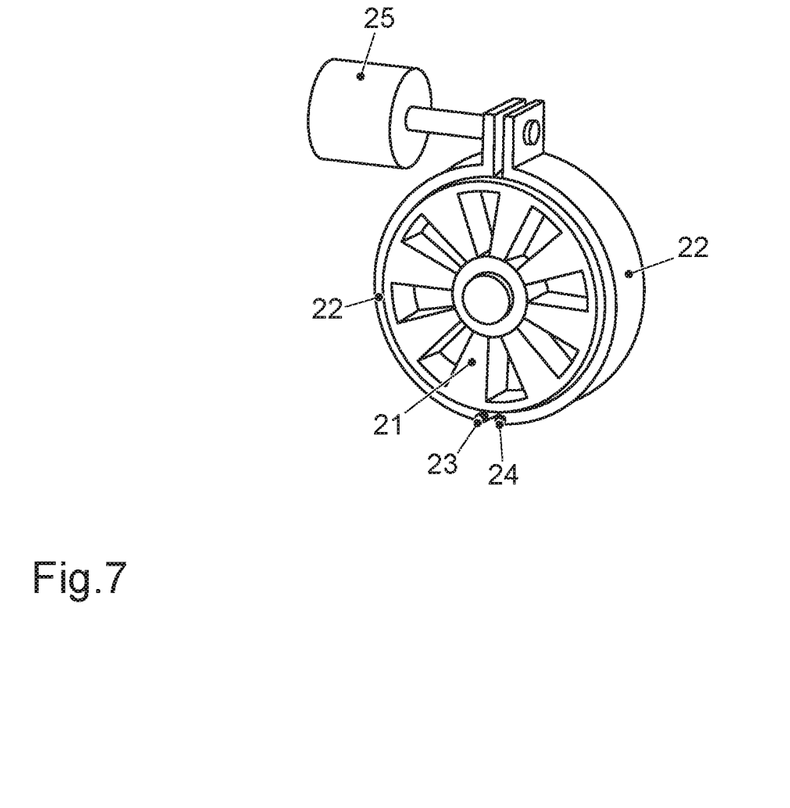
FIG. 7 shows one variant of the brake system in accordance with the invention with a drive of the brake elements via a solenoid which acts on them.

A further alternative refinement of a brake system in accordance with the invention is shown in FIG. 7. Here, only the components that are essential for the function of the brake system are shown. The brake system of FIG. 7 has a rotational element 21 to which a valve body is coupled for regulating the throughflow of cooling liquid. The rotational element 21 is enclosed by brake elements 22 that are mounted in pivot points 23 and 24 in a pivotably movable manner with respect to the rotational element 21 to produce a braking action. In this embodiment, the pivoting movement is carried out by a solenoid 25, via which the brake elements 22 can be pivoted onto the rotational element 21 until they bear against the rotational element 21 in a pressing manner.

Figure 8:
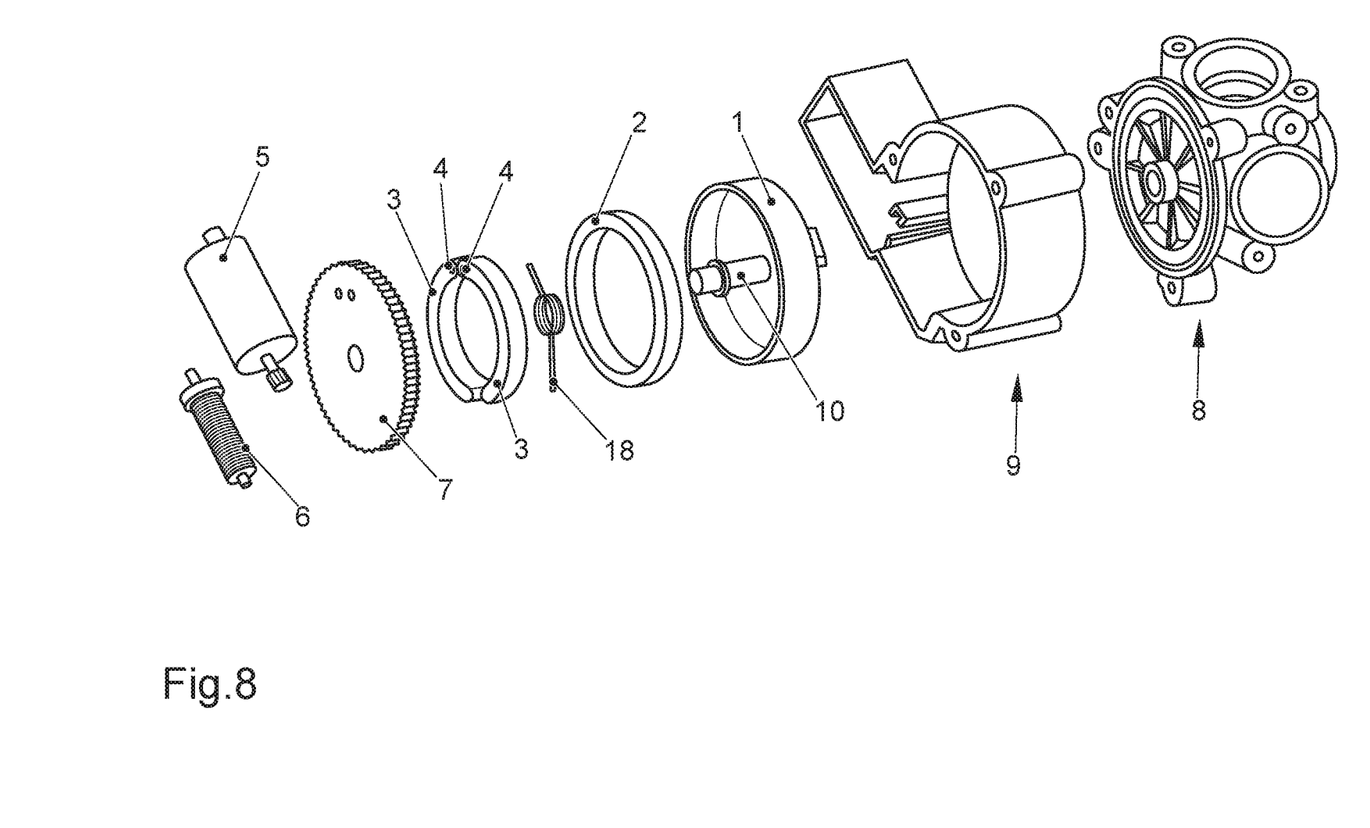
FIG. 8 shows an exploded illustration of a brake system in a further variant with a drive via an adjusting mechanism.
Figure 9:
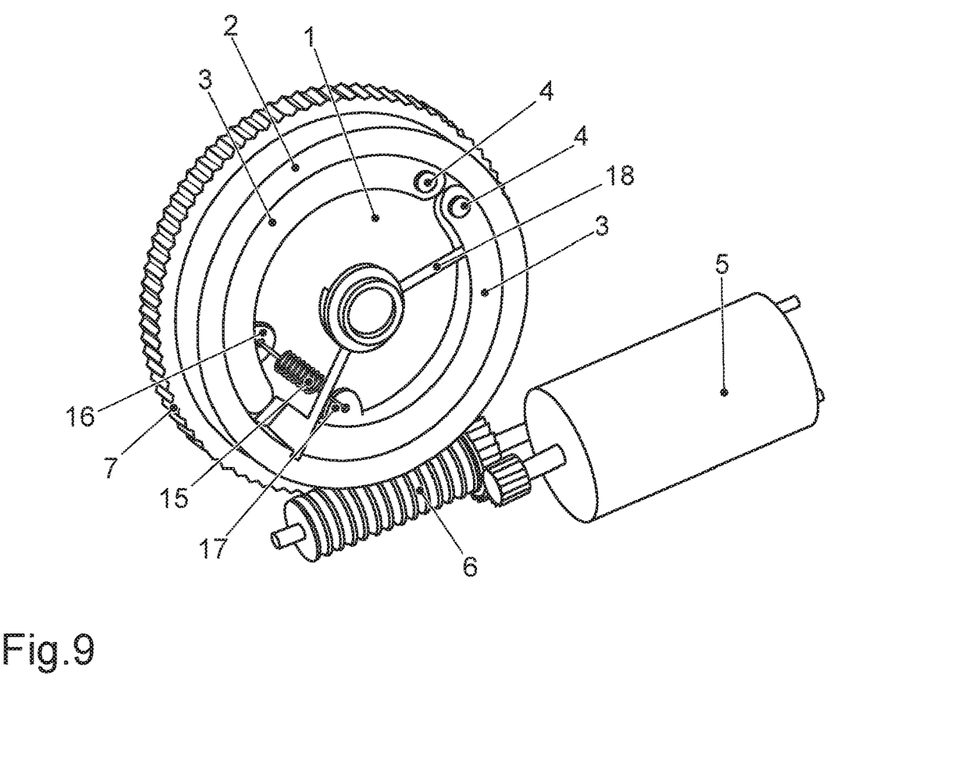
FIG. 9 shows the drive according to FIG. 8 in the assembled state.
Figure 10:
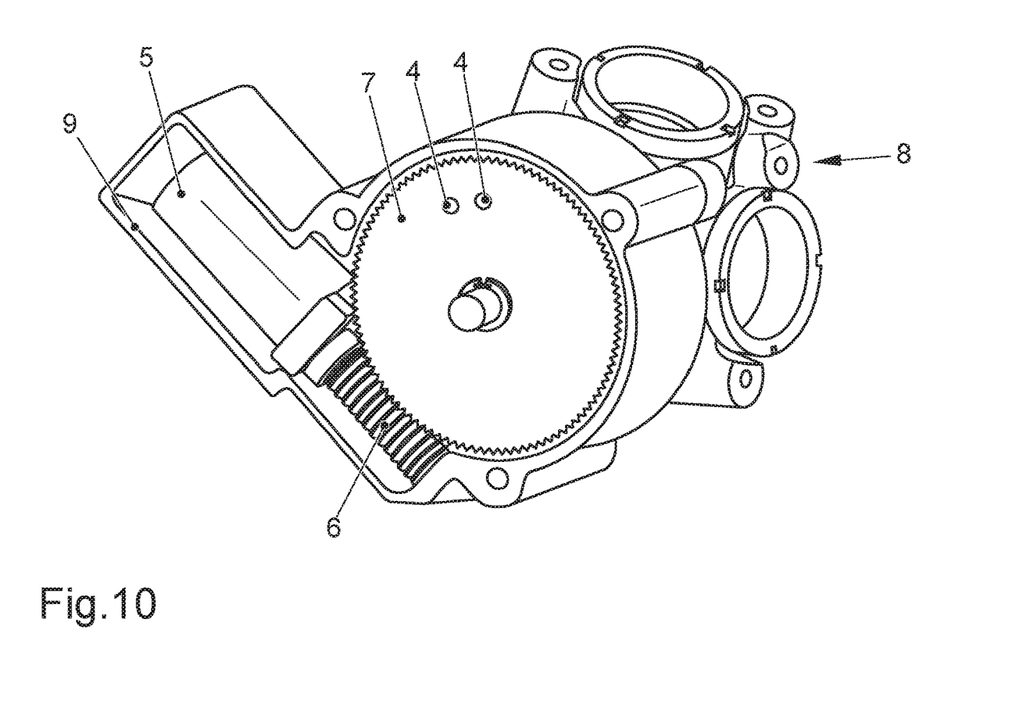
FIG. 10 shows the drive according to FIGS. 8 and 9 in an assembly with the valve apparatus.

FIG. 8 is an exploded illustration of a further alternative refinement of a brake system for regulating the coolant flow in a valve apparatus. The assembled state of said alternative system is shown in FIGS. 9 and 10. The brake system according to FIGS. 8-10 is constructed from an actuator (=motor 5), by way of which a worm gear 6 can be driven directly or indirectly. The worm gear 6 drives a gearwheel 7 with spur toothing in a brake system in the refinement in accordance with the above-described constructions of FIGS. 1-7, in order for it to be possible, in a valve apparatus 8, for a valve body (not shown) to be moved by way of rotation or displacement from an open position into a closed position and into any desired positions in between. The brake system is constructed from a rotor 1, a stator 2 and the pivotably movable brake elements 3, 13 and 22 that are mounted pivotably at pivot points 4. The components are installed into a brake system housing 9. In the assembled state, the brake system is attached to the valve apparatus 8 to adjust the valve body (via the axle 10 of the rotor 1 in the illustrated embodiment).

A restoring spring 15 acts in each case on the free ends of the brake elements (3, 13, 22) to move the brake elements (3, 13, 22) from a position in which they are pivoted into the braking position under the magnetic action, into the non-braking position by pivoting about the pivot points (4, 14, 23, 24). The pivot points (4, 14, 23, 24) are shown merely in FIG. 9, but also are necessary in a corresponding way for the function of the brake systems that are shown and described overall in FIGS. 1 to 10 in this form and in a modified form. The restoring spring 15 is suspended on a suspension lug 16 and 17.

A safety spring 18 also is shown only in FIG. 9, but also expediently is used in all other refinements of the brake system in accordance with the invention. More particularly, the safety spring 18 moves the brake elements 3, 13, 22 into a non-braking position, for example in the case of a power failure or another malfunction of the system, in which non-braking position the valve body is situated completely in the open position with a maximum throughflow of cooling liquid. In this way, damage to the internal combustion engine as a result of overheating can be avoided.

LIST OF DESIGNATIONS

1 Rotor
2 Stator
3 Brake element
4 Pivot point
5 Actuator/motor
6 Worm gear
7 Gearwheel
8 Valve apparatus
9 Brake system housing
10 Axle
11 Rotor
12 Stator
13 Brake element
14 Pivot point
15 Restoring spring
16 Suspension lug
17 Suspension lug
18 Safety spring
21 Rotational element
22 Brake element
23, 24 Pivot point
25 Holding magnet

What is claimed is:

1. An apparatus for regulating a coolant flow for an internal combustion engine in a motor vehicle, the apparatus comprising:
　a valve apparatus having a throughflow opening;
　a valve body rotatably disposed in the valve apparatus and being configured for selectively opening and closing the throughflow opening;

a rotor connected to the valve body and being rotatable with the valve body about a rotational axis;

a magnetic stator having an inner or outer circumferential surface substantially concentric with the rotational axis of the rotor; and a brake system having two opposed brake elements with circumferentially extending braking surfaces opposed to the inner or outer circumferential surface of the stator, the brake elements being mounted for rotation with the rotor and the valve body and being pivotable about pivot points spaced from the rotational axis of the rotor between a braking position where the circumferentially extending braking surfaces of the brake elements engage the inner or outer circumferential surface of the stator and a non-braking position where the circumferentially extending braking surfaces of the brake elements are spaced from the inner or outer circumferential surface of the rotor stator, the brake system further having an electromagnetic brake element actuator that selectively energizes the magnetic stator to pivot the brake elements into braking engagement with the stator to regulate a volume of the coolant flow.

2. The apparatus of claim 1, wherein
the valve body is arranged in the valve apparatus or in the brake system housing such that the valve body can be rotated on an axle of the brake system.

3. The apparatus of claim 1, wherein
the valve body is in the valve apparatus or in the brake system housing such that the valve body can be displaced via an axle of the brake system.

4. The apparatus of claim 1, wherein
the brake elements that can be moved under magnetic action of the electromagnetic brake element actuator are opposed to the outer circumferential surface of the magnetic stator of the brake system.

5. The apparatus of claim 4, wherein
the brake elements can be brought into a braking action by way of energization of the electromagnetic brake element actuator of the brake system for setting the position of the valve body.

6. The apparatus of claim 1, further comprising
a rotational element connected to the valve body to adjust the valve body, the rotational element being provided with the brake elements that can be adjusted via an adjusting mechanism.

7. The apparatus of claim 6, wherein
a setting of a position of the valve body takes place via a gearwheel that can be connected to the valve body and can be driven via an actuator/motor via a directly or indirectly driven worm gear.

8. The apparatus of claim 1, wherein the brake elements are opposed to the inner circumferential surface of the magnetic stator, and the apparatus further comprising
a restoring springs connecting free ends of the respective brake elements remote from the pivot points of the brake elements.

9. The apparatus of claim 1, the brake elements can be moved into the non-braking position under the action of a safety spring in a power failure in which non-braking position the valve body releases a maximum coolant throughflow.

10. The apparatus for regulating the coolant flow by means of a movable valve body in the valve apparatus of claim 1, wherein
the movable valve body being in at least one throughflow opening of the valve apparatus for an internal combustion engine in a motor vehicle.

11. The apparatus of claim 1, wherein the brake elements are disposed substantially concentrically between the rotor and the stator.

12. The apparatus of claim 1 further comprising a motor for selectively rotating the valve body.

* * * * *